UNITED STATES PATENT OFFICE.

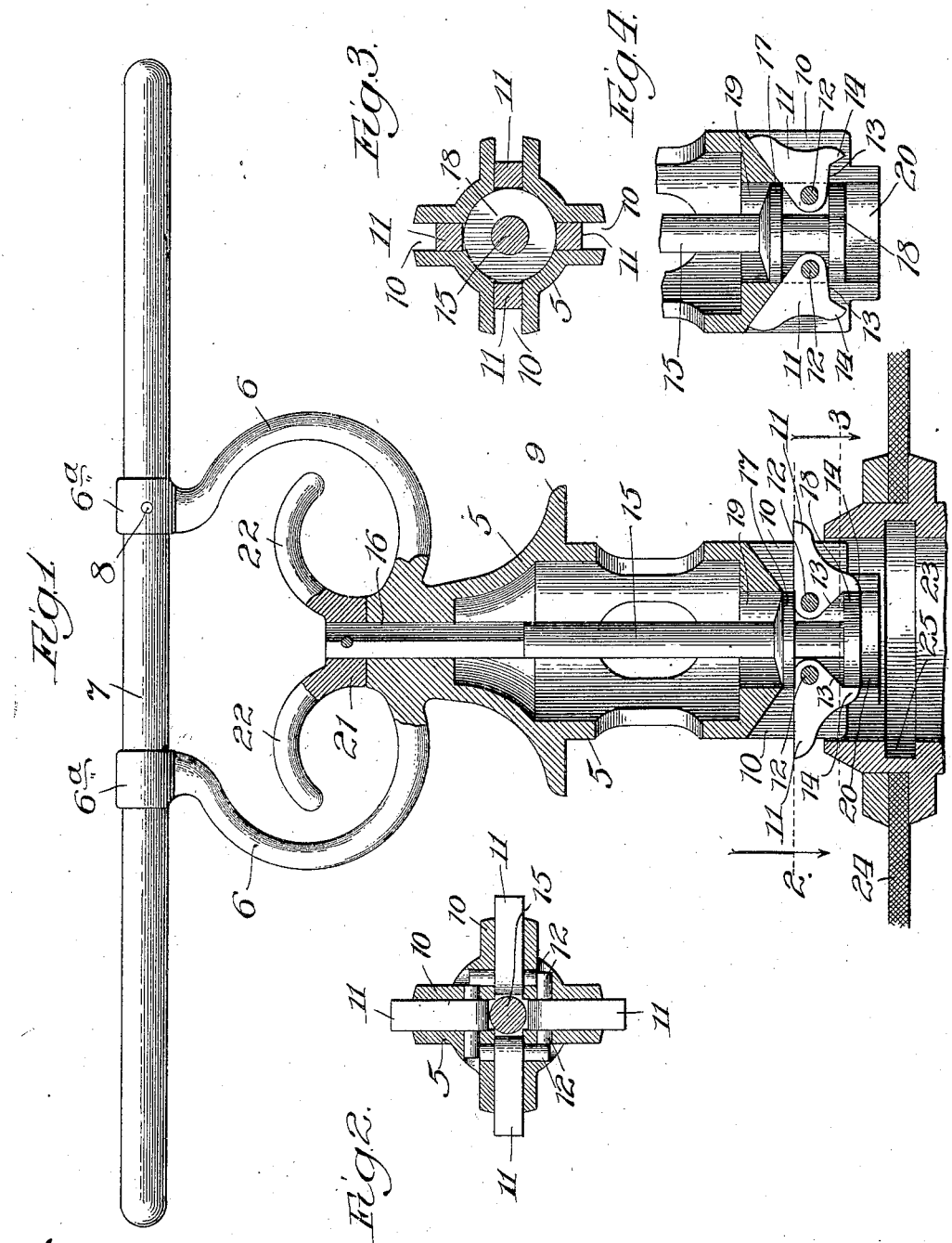

BRYAN D. PINKNEY, OF CHICAGO, ILLINOIS, ASSIGNOR TO E. GOLDMAN & COMPANY, OF CHICAGO, ILLINOIS, A CORPORATION OF ILLINOIS.

FILTER-CELL-LIFTING IMPLEMENT.

No. 836,340.

Specification of Letters Patent.

Patented Nov. 20, 1906.

Application filed June 18, 1906. Serial No. 322,303.

*To all whom it may concern:*

Be it known that I, BRYAN D. PINKNEY, a citizen of the United States, residing at Chicago, in the county of Cook and State of Illinois, have invented a new and useful Improvement in Filter-Cell-Lifting Implements, of which the following is a specification.

My invention relates to an improvement in the class of filter-cell-lifting implements employing a head provided with arms carrying a handle, the lower portion of the head carrying dogs adapted to engage a filter-cell within its central opening and the head further carrying centrally a longitudinally-movable plunger-rod, through the medium of which to retract the dogs from their normal protruded condition to permit the insertion and withdrawal of the implement.

The object of my invention is to dispense with the use of springs, which have heretofore been employed in the construction of implements of this class for the purpose of causing the dogs to engage the filter-cells and to so construct the implement as to cause the dogs to act by gravity in assuming their protruding position to interlock with a cell.

Referring to the accompanying drawings, Figure 1 is a view in sectional elevation of my improved implement, showing the lower end of the head extending into the central opening of a filter-cell. Figs. 2 and 3 are plan sectional views taken, respectively, at the lines 2 and 3 on Fig. 1 and viewed in the direction of the arrows; and Fig. 4 is a view, in sectional elevation, of the lower end of the implement, showing the position of the dogs and plunger-rod when the dogs are turned to the raised position to permit the implement to be introduced into or withdrawn from a cell-opening.

The head 5 of the implement is provided on its upper end with upwardly-extending arms 6 6, having alining eyes 6ª for receiving a handle-bar 7, which may be removably secured in place, as by a pin 8. The head is provided with an annular lateral stop-flange 9 intermediate its ends and also at its lower end with slots 10 at right angles to each other, in each of which is pivoted at 12 a dog 11, thereby adapting the dogs to normally protrude laterally at their free ends beyond the head. Each dog is provided below its pivot with a cam-surface 13, terminating at its lower end in a shoulder 14, adapted to be engaged by a collar on a plunger-rod for maintaining the dogs 11 in extended position, as hereinafter described.

A plunger-rod 15 is slidably secured at its squared upper end in a square hole or bearing 16 in the upper part of the head and carries near its lower end two fixed collars 17 and 18, spaced apart and forming flanges between which the dogs extend at their pivoted ends, the collars being slidably confined in bearings 19 and 20 in the head, respectively above and below the dogs. On the upper end of the rod 15 is a collar 21, provided with finger-grips 22, by which to manipulate the rod.

The operation of the implement is as follows: The lower end of the head is inserted into the central opening 23 in a filter-cell 24 to be placed in or removed from a filter-casing, the flange 9 serving to limit the inward movement of the implement. During this operation the edges of the cell-opening engage the free ends of the protruding dogs, causing them to turn on their pivots by the progressive insertion of the implement and raise the plunger-rod, the dogs remaining in raised position until their free ends register with the groove or annular recess 25, formed about the cell-opening 23. Thereupon the weight of the rod exerted against the dogs at the collar 17 causes them to turn and extend into the groove interlocking therewith, the extended position of the dogs being illustrated in Fig. 1. Upon raising the implement by its handle the dogs engage the upper wall of the groove 25, the weight of the cell against the dogs causing the shoulders 14 to abut against the collar 18, thereby locking the dogs in extended condition until released. The implement may be released from engagement with the cell by gripping the handle 7 and finger-grips 22 to move them toward each other, thereby causing the plunger-rod to rise within the head, the collar 18 thus moving against the cam-surfaces of the dogs with the result of turning the latter on their pivots to the raised and withdrawn position indicated in Fig. 4, whereupon the implement may be readily removed from the cell-opening.

What I claim as new, and desire to secure by Letters Patent, is—

1. In a filter-cell-lifting implement, the combination of a head provided with a handle, dogs pivotally supported on the lower part of said head to tend to drop by gravity to their normal protruding position, and a plunger-rod extending longitudinally through said head and carrying a hand-grip on its outer end, and, on its inner end, a dog-engaging flange, for the purpose set forth.

2. In a filter-cell-lifting implement, the combination of a head provided with a handle, dogs pivotally supported on the lower part of said head to tend to drop by gravity to their normal protruding position, and a plunger-rod extending longitudinally through said head and carrying a hand-grip on its outer end, and, on its inner end, flanges between which said dogs are pivoted to the head, for the purpose set forth.

3. In a filter-cell-lifting implement, the combination of a head provided with a handle, dogs pivotally supported on the lower part of said head to tend to drop by gravity to their normal protruding position, and a plunger-rod extending longitudinally through said head and carrying a hand-grip on its outer end and, on its inner end, a dog-engaging flange, and shoulders upon the dogs to engage said flange, for the purpose set forth.

4. In a filter-cell-lifting implement, the combination of a head provided with projecting arms and a handle detachably connected to said arms, dogs pivotally supported on the lower part of said head to tend to drop by gravity to their normal protruding position, and a plunger-rod extending longitudinally through said head and carrying a hand-grip on its outer end, and, on its inner end, flanges between which said dogs are pivoted on the head, for the purpose set forth.

5. In a filter-cell-lifting implement, the combination of a head provided with a handle, dogs, provided with cam-surfaces, pivotally supported on the lower part of said head to tend to drop by gravity to their normal protruding position, and a plunger-rod extending longitudinally through said head and carrying a finger-grip on its outer end, and, on its inner end, a dog-engaging collar adapted to engage the cam-surfaces of the dogs during the lifting of the plunger-rod to raise the dogs on their pivots, for the purpose set forth.

6. In a filter-cell-lifting implement, the combination of a head provided with a handle, dogs, provided with cam-surfaces, pivotally supported on the lower part of said head to tend to drop by gravity to their normal protruding position, and a plunger-rod extending longitudinally through said head and carrying a finger-grip on its outer end, and, on its inner end, collars between which said dogs are pivoted to the head, the lower one of said collars being adapted to engage the cam-surfaces of the dogs during the lifting of the plunger-rod to raise the dogs on their pivots, for the purpose set forth.

7. In a filter-cell-lifting implement, the combination of a head provided with a handle, dogs, provided with cam-surfaces terminating in shoulders and pivotally supported on the lower part of said head to tend to drop by gravity to their normal protruding position, and a plunger-rod extending longitudinally through said head and carrying a finger-grip on its outer end and, on its inner end, collars between which said dogs are pivoted to the head, the lower collar being adapted to be engaged by the shoulders when the dogs are in their normal protruding position, and to engage the cam-surfaces thereof for raising the dogs when the plunger is lifted.

BRYAN D. PINKNEY.

In presence of—
W. B. DAVIES,
J. H. LANDES.